(12) United States Patent
Pettersson et al.

(10) Patent No.: US 9,086,262 B2
(45) Date of Patent: Jul. 21, 2015

(54) COORDINATE MEASURING MACHINE

(75) Inventors: Bo Pettersson, London (GB); Knut Siercks, Moerschwil (CH); Bernhard Sprenger, Widnau (CH)

(73) Assignee: HEXAGON TECHNOLOGY CENTER GMBH, Heerbrugg (CH)

( * ) Notice: Subject to any disclaimer, the term of this patent is extended or adjusted under 35 U.S.C. 154(b) by 79 days.

(21) Appl. No.: 14/002,089

(22) PCT Filed: Mar. 27, 2012

(86) PCT No.: PCT/EP2012/055394
§ 371 (c)(1),
(2), (4) Date: Aug. 28, 2013

(87) PCT Pub. No.: WO2012/130832
PCT Pub. Date: Oct. 4, 2012

(65) Prior Publication Data
US 2014/0007441 A1    Jan. 9, 2014

(30) Foreign Application Priority Data
Mar. 29, 2011 (EP) ..................................... 11160313

(51) Int. Cl.
*G01B 5/008* (2006.01)
*G01B 21/04* (2006.01)

(52) U.S. Cl.
CPC .............. *G01B 5/008* (2013.01); *G01B 21/045* (2013.01)

(58) Field of Classification Search
CPC ............................... G01B 5/008; G01B 21/045
USPC .................................................... 33/503, 702
See application file for complete search history.

(56) References Cited

U.S. PATENT DOCUMENTS 4,569,138 A * 2/1986 Tute ................................ 33/700
4,651,426 A * 3/1987 Band et al. ...................... 33/1 M
(Continued)

FOREIGN PATENT DOCUMENTS

CN     1045645 A     9/1990
CN     1062035 A     6/1992
(Continued)

OTHER PUBLICATIONS

JP Office Action dated Oct. 7, 2014 as received in Application No. 2014-501574 (Englsih Translation).
(Continued)

*Primary Examiner* — Christopher Fulton
(74) *Attorney, Agent, or Firm* — Maschoff Brennan

(57) ABSTRACT

A coordinate measurement machine with a first frame element, a second frame element, a linear drive unit with a motor for moving the second frame element relative to the first frame element and a position measurement instrument, for determining a drive position of the second frame element relative to the first frame element. The drive unit has limited stiffness and dynamic deflections on movement. The machine comprises a mechanical coupler from the drive unit to the second frame element, which coupler comprises a first part fixed to the drive unit and a second part fixed to the second frame element, which parts are movable relative to each other by an active compensation actuator. The active compensation actuator is built in such a way to shift the second frame element against the drive unit to introduce a counter-displacement in such a way that the dynamic deflections are at least partially compensated.

25 Claims, 5 Drawing Sheets

(56) References Cited

U.S. PATENT DOCUMENTS

| | | | |
|---|---|---|---|
| 4,866,643 A * | 9/1989 | Dutler | 702/95 |
| 4,928,396 A | 5/1990 | Raleigh | |
| 4,947,557 A * | 8/1990 | Gapshis et al. | 33/503 |
| 4,950,079 A * | 8/1990 | McMurtry et al. | 356/493 |
| 5,189,805 A | 3/1993 | Matsumoto et al. | |
| 5,660,255 A | 8/1997 | Schubert et al. | |
| 6,175,793 B1 | 1/2001 | Ironside | |
| 6,176,018 B1 * | 1/2001 | Wiklund | 33/1 M |
| 6,629,374 B2 * | 10/2003 | Melzer et al. | 33/555 |
| 7,636,170 B1 * | 12/2009 | Jywe et al. | 356/614 |
| 8,452,564 B2 * | 5/2013 | Balsamo et al. | 702/95 |
| 8,516,710 B2 * | 8/2013 | Jordil | 33/503 |
| 8,908,194 B2 * | 12/2014 | Verdi et al. | 356/614 |
| 2007/0266781 A1 | 11/2007 | Nemoto et al. | |
| 2008/0100156 A1 | 5/2008 | Gabsi et al. | |
| 2009/0152985 A1 | 6/2009 | Yamada et al. | |
| 2012/0105866 A1 * | 5/2012 | Pettersson et al. | 356/601 |

FOREIGN PATENT DOCUMENTS

| | | |
|---|---|---|
| CN | 1556369 A | 12/2004 |
| CN | 101562409 A | 10/2009 |
| DE | 43 40 477 C1 | 4/1995 |
| DE | 196 42 827 A1 | 10/1997 |
| EP | 1687589 | 11/2004 |
| EP | 1559990 | 1/2005 |
| GB | 2425840 | 4/2005 |
| JP | 58-034333 A | 2/1983 |
| JP | S63-067814 A | 3/1988 |
| JP | H08-054039 A | 2/1996 |
| JP | 2009-281533 A | 12/2009 |
| WO | 94/24537 A1 | 10/1994 |
| WO | 00/14474 A1 | 3/2000 |
| WO | 2004/034010 A1 | 4/2004 |

OTHER PUBLICATIONS

European Search Report dated Jul. 21, 2011 as received in Application No. EP 11 15 7943.

* cited by examiner

COORDINATE MEASURING MACHINE

FIELD OF THE INVENTION

The present invention relates generally to a coordinate measuring machine (CMM) for determination of at least one space coordinate of a measurement point and to a method of compensating errors in a coordinate measuring machine.

BACKGROUND

After workpieces have been produced, it is common practice to inspect them on a coordinate positioning apparatus, such as a coordinate measuring machine (CMM), having a movable measurement probe head within a working volume of the machine.

In a conventional three-dimensional measuring machine, the probe head is supported for movement along three mutually perpendicular axes (in directions X, Y and Z), also referred to as Cartesian configuration with linear axes being more or less orthogonal towards each other.

In a simple form of the machine, a suitable transducer is mounted parallel to each axis and is used to determine the position of the probe head relative to a base of the machine. The coordinates of a measurement point on an object being approached by a probe at the probe head are determined according to the transducer's values. The axis is often driven by a propulsion motor, which is controlled by a dedicated controller, comprising a digital computation unit which moves the axis according to a measurement program or by user input, e.g. by Joystick.

There are several possible sources of error, if such a technique is employed. Lack of straightness in movement and of orthogonality of the axes, lateral offset in the linear drive mechanisms or angular rotation of the carriages about axes perpendicular to their directions of movement, are just a few examples.

Particularly, the following error factors may occur:
scale errors on axes,
horizontal straightness errors on axes,
vertical straightness errors on axes,
pitching errors on axes,
yawing errors on axes,
rolling errors on axes, and
angular errors between axes.

Many attempts have been made to provide correction for the various sources of error referred to. For example, it is known to introduce a deliberate and known error into the transducers by various means. An alternative technique is to calibrate the machine, measuring the errors existing at various points and storing these, so that they can be compensated when the machine is in measurement use. The execution of such a calibration process is lengthy, especially for a large machine.

A drawback of the calibration methods is also that they will only take care of fully repeatable errors and it is also important to calibrate the probe under the same conditions as in the working state of the machine. This means e.g. that, if the machine runs with 100 mm/sec at measurement, the calibration procedure also should be performed with that speed, and if—for some reason—a change of the running speed is necessary, a recalibration of the machine at this new speed is required, as the errors are at least partly dependent on the dynamics of movement.

The mentioned errors are only analyzed statically in many approaches, although they also comprise dynamic factors which are dependent on the movement of the axes, in particular dependent on the position, speed, acceleration and jerk when moving the axis. With the speed-dependent calibration, this fact is taken into account in a rather simple and inflexible way.

While the static errors can be numerically reduced by the use of position calibration matrices, things get much more complex when trying to compensate the dynamic errors. The calibration gets even more complex when taking into account the dynamic errors, such as vibrations, resonance, dynamic forces, etc. which errors can not only influence the axis on which they are occurring, but which can also "crosstalk" to other axes and cause errors in other parts of the system. Furthermore, the underlying effects can also be dependent on environmental conditions such as temperature, humidity, air-pressure, etc. and in particular, they will also vary over the lifetime of the machine.

Also, an exchange of the probe-head, which is often necessary for fulfilling different measurement tasks on a workpiece, can bring a change of load conditions and result in different dynamics and error behaviour. The usage of probe heads which comprise movable parts and/or additional axes, either active or passive, can result in a different behaviour of the main axis, depending on the actual posture of the probe head. The dynamic behaviour of a machine's axis (as two elements of the machine frame movable relative to each other in a direction of movement) can also vary dependent upon the actual drive position of the axis.

For example, it has to be considered that accelerations of one axis of the machine (which can move further perpendicular axes and the probe head), can cause linear and angular dynamic deflections of the whole frame of the coordinate measuring machine, which in turn cause measurement uncertainties and errors. These dynamic measurement errors may be reduced by taking measurements at low accelerations, e.g. by a consequently optimized trajectory of desired movement.

However, to increase the productivity, an increased throughput as well as an increased inspection speed is demanded. Hence, the machine will experience higher accelerations during the measurements, and larger dynamic structural deflections of the system will result. This leads to an inaccurate reporting of the X, Y, Z geometric position of the probe, resulting in a reduced accuracy or even in incorrect measurements of the workpiece. Those errors are even more severe as CMMs are often required to achieve a measurement accuracy in the range of micrometers or even below.

In particular, a coordinate measuring machine can exhibit drive vibration which can be significant in view of the desired measurement accuracy. The main source of error causing the vibration is the machine's mechanical drive system. The drive vibration is also dependent upon the drive's running speed. Errors caused by these vibrations (typically occurring with a frequency above 5 Hz) are not suitable for calculative methods of compensating dynamic errors as mentioned above, especially as the vibrations are to a great extent non repeatable behaviours, wherefore the resulting measurement errors can not be mathematically modelled and equalized. Also, non-perfect bearings can introduce friction and cause vibrations.

There are passive damping elements known, which introduce a mechanical low-pass or band pass filtering into the mechanical system to reduce vibrations and jerk as far as possible. Those can be integrated parts of the machine, for example by usage of a somewhat "elastic" and "damping" belt in the transmission system or by air or liquid dampers parallel to the axis. Drawbacks of those passive dampers are for example the facts that they can reduce the stiffness of the system, introduce derivation from the desired trajectory of movement by undesired deflection (or displacement) and they can even introduce additional mechanical resonance frequencies.

Other approaches, as e.g. propagated by Convolve Inc. NY, are trying to suppress deflections, vibrations and/or oscillations caused by the acceleration of the machine by a technology called input-shaping, which controls the regulating variable, e.g. the force or current of a propulsion motor, in such a way as to bypass mechanical resonances and avoid a stimulation of resonance frequencies or even actively counterforce oscillations by a accordingly manipulated variable on the output to the driving actuator control.

Also model predictive control, as a form of control in which the current control action is obtained by solving at each sampling instant a finite horizon open-loop optimal control problem, using the current state of the plant as the initial state, can be applied to CMMs. The optimisation yields an optimal control sequence and the first control in the sequence is then applied to the plant.

Furthermore, a variety of probe heads and probes are employed in a coordinate measuring machine for measurements within the scale coordinate system, for example by reference scales arranged along axes, that configure the three-dimensional measuring space. To provide the coordinate measuring machine with an improved measurement precision, its frame structure is therefore required to have a high static stiffness. In order to achieve a stiff and rigid machine design, the frame structure or at least parts of it, is often made of stone, such as granite. Besides all the positive effects like thermal stability and good damping properties, the granite also makes the machine and the movable frame elements quite heavy. The high weight on the other side also requires high forces for a decent acceleration.

In addition to the desirable high frame stiffness, the mentioned introduction of a software implemented spatial precision correction technology can reduce geometrical errors and assist in achieving high precision measurement results.

Another problem in CMM systems lies also in the fact that different probes will have different weights and characteristics, wherefore the machine's mechanical resonance frequencies will be influenced. Also, the spatial position of the machine influences the mechanical resonances, wherefore a simple linear error model is often not sufficient to compensate those influences numerically.

Exemplarily, EP 1 559 990 discloses a coordinate measuring system and method of correcting coordinates measured in a coordinate measuring machine, measuring geometrical errors while parts with various weights are mounted on the coordinate measuring machine. Compensation parameters are derived from measured results per a weight of a part and stored. A compensation parameter corresponding to a weight of a part to be measured is appropriately read out to correct measured coordinates of the part to be measured.

As a further example, EP 1 687 589 discloses a method of error compensation in a coordinate measuring machine with an articulating probe head having a surface detecting device. The surface detecting device is rotated about at least one axis of the articulating probe head during measurement. The method comprises the steps of: determining the stiffness of the whole or part of the apparatus, determining one or more factors which relate to the load applied by the articulating probe head at any particular instant, and determining the measurement error at the surface sensing device caused by the load.

Another approach for error correction of work piece measurements with a coordinate measuring machine (CMM) is disclosed in GB 2 425 840. Thereby, position measurements are taken with a work piece sensing probe, in which means of measuring acceleration are provided. The measurements are corrected for both high frequency (unrepeatable) errors such as those due to vibration, and low frequency (repeatable) errors such as those due to centrifugal forces on the probe. The correction method comprises measuring the work piece, determining repeatable measurement errors from a predetermined error function, error map or error look-up table, measuring acceleration and calculating unrepeatable measurement errors, combining the first and second measurement errors to determine total errors and correcting the work piece measurements using the total errors. The predetermined error map is calculated using an artefact of known dimensions.

It is also known to use accelerometers fitted in the probe or on other moving parts of the measurement machine, e.g. the Z-column and/or in the base table, allowing a differential measurement and/or the evaluation of externally applied vibrations. In such an arrangement, the displacements and errors of the probe-position can be measured with double integration, and based on this information it is possible to adjust the reading with the difference between the doubly integrated signal and the scales.

However, when using accelerometers, the position measurement will usually become noisy, in particular when the frequencies to be measured are relatively low, for example in case of slow and smooth motions. This can result in a bad signal to noise ratio.

Furthermore, it may only be possible to measure differences during acceleration, which means that—in general—it may be necessary to calculate the acceleration from the scale position and to compare it with the measured acceleration, and doubly integrate the difference. However, this may not be enough information to accurately calculate the exact position of the probe. Accelerometer methods can not be used to measure static changes. For example, static friction combined with dynamic changes can not be apprehended by accelerometers.

In particular for large CMMs, shaky environments, and/or if a very high accuracy is required, it is known to build special foundations designed for the erection of measurement machines to achieve a suppression of externally applied vibrations coming from the environment of the measurement machine or to allow a compensation of a possible settling of the machine either coming from the load of the machine itself or from the load of the workpiece to be measured.

Alternatively or in addition to a special foundation, it is also known to set up a CMM using passive or active components for a further decoupling of the measurement machine bed from the ground to avoid or at least reduce influences from external disturbances on the measurement results.

Other related documents are CN 101 562 409, US 2008/100156, DE 196 42 827, US 2009/152985, US 2007/266781, WO 00/14474.

For the propulsion of the machine's axes, there are many different kinds of transmission or drive systems and mechanics known.

An embodiment used quite often comprises a transmission belt, tooth-belt, friction belts, screw, rack and pinion, etc. There needs to be a coupling on the path of transmission of the force between a first frame element with the propulsion unit on one side—and a second frame element, e.g. the probe head, to being moved on the other side. The propulsion unit can be embodied as an electro-mechanical transducer, in particular an electric motor based on magnetic, electrostatic or piezo-active principle. The drive mechanism to achieve the coupling of forces is often designed in such a way that it is stiff in the moving direction and weak in other directions, to allow movement in the other directions without introducing undesired forces in any other direction but the moving direction.

When, for example, a tooth-belt is used, it is relatively easy to avoid forces in the "non moving directions" since the belt as such is flexible, in particular in the directions other than alongside the belt. If a stiffer drive unit such as a screw or rack and pinion is used, then there is a need to have a more sophisticated decoupling of unwanted forces to avoid undesired effects which might reduce accuracy, reproducibility, increase friction, increase wear and/or introduce undesired deformations. There are many mechanical components and arrangements known for achieving such couplings, which are stiff in one degree of freedom only, such as e.g. cardan couplings or gimbals.

In particular when using a belt-drive, there are some disadvantages one of which is the limited stiffness which will result in flexion or distension during acceleration. Furthermore, the limited stiffness can behave like a mechanical resonance circuit which can be modelled by at least one spring—in particular embodied by the elastically behaving tooth-belt—and at least one mass—embodied by the movable member. This will limit the acceleration or force which can be applied to the axis without severe position displacement due to drive mechanism deflection or a stimulation of oscillations. This fact often limits the acceleration profile or force-profile which can practically be applied to the moving member and will also result in at least one mechanical resonance of the system.

A second disadvantage of a toothed belt or another toothed force transmission principle, such as a rack and pinion, are micro vibrations due to the teeth and/or drive wheels. Similar micro vibration can also result from the propulsion motors (also referred to as drive motors) themselves due to effects like torque-ripple (e.g. motor-cogging, oscillations inside the control loop, in particular in cascaded control loops, etc.) or from non-perfect bearings. The vibrations and excitation frequencies to the CMM system in those cases are dependent on the moving speed. Especially when an excitation of a natural frequency of a part of the mechanics occurs, this can lead to an undesired trajectory of movement. In particular, by the high accuracy scales used in such measurement machines, those micro vibrations can often be observed in the measured position or velocity profile of a moving machine, in particular as oscillations overlaid onto the actually desired trajectory profile.

SUMMARY

It is therefore an object of the present invention to provide an improved coordinate measuring machine CMM and a method wherein errors caused by dynamic effects can be compensated or at least reduced in an improved manner, in particular dynamic effects caused by weak machine-structures when running the CMM at high speed.

A particular object of the invention is to reduce displacement errors in each linear drive mechanism (in the X, Y, Z directions) of the CMM.

A further object is to actively counter dynamic displacements, in particular by an additional, dedicated active compensation actuator.

A special object of the invention is thereby to compensate or at least reduce effects of a drive mechanism having limited stiffness, in particular during acceleration and deceleration of the axis or by backlash effects.

A particular object of the invention is to reduce or compensate oscillations resulting from the limited stiffness of the drive mechanism of the axis, which can be interpreted as a mass-spring-oscillator.

A further object of the invention is to reduce or compensate micro-vibrations occurring in the movement of the axis, for example coming from the drive mechanism and/or the bearings, in particular from a tooth system of the drive unit and/or the propulsion motor of the axis.

Yet another object of the invention is to provide an active compensation system to be integrated in a CMM's drive mechanism, which for example can also be retrofitted.

A further object of the invention is to provide a basis for a numerical solution to compensate dynamic displacement errors in a CMM.

These objects are achieved by realising the features of the independent claims. Features which further develop the invention in an alternative or advantageous manner are described in the dependent patent claims.

One basic idea within the invention is to actively take care of the displacements generated by the dynamics of the drive mechanism by a system and method further referred to as active compensation or active damping. The term "damping", in this case, does not only refer to an absorption of shock or vibration but to a more general, active countering and opposing to the undesired effect, as indicated by the term "active damping".

The present invention refers to a coordinate measurement machine for determination of at least one space coordinate of a measurement point on an measured object, with at least a first frame element, a second frame element, a linear drive unit with a motor for moving the second frame element relative to the first frame element in a direction of movement and a position measurement instrument, for determining a drive position of the first frame element relative to the second frame element.

The drive unit has limited stiffness and dynamic deflections on movement, in particular wherein dynamic deflections comprise a dynamic deformation in the drive unit at acceleration/deceleration and/or a transient oscillation in the drive unit, stimulated by the movement.

According to the invention, a mechanical coupler from the drive unit to the second frame element is comprised, which coupler is movable, in particular in the direction of movement, by an active compensation actuator. The coupler can e.g. be built to be movable by two parts either being relocatable or slideable against each other or being linked by a flexible element, which can be deformed by the active compensation actuator.

The active compensation actuator is built in such a way to shift the second frame element against the drive unit to introduce a counter-displacement in such a way that the dynamic deflections are at least partially compensated. The coupler together with the active compensation actuator is also referred to as active compensation element.

According to the invention, the compensation is achieved by countering the dynamic displacements, in particular of the deflections and/or the oscillations coming from the spring mass combination—as which the axis of the machine and in particular the drive mechanism and the moved mass can be interpreted. Also backlash or play can be reduced or compensated to a certain extent.

The term "compensated" in the present application does not necessarily refer to a full cancellation, but is also used to express a perceptible reduction which can nevertheless still leave some residual error.

As mentioned, the coordinate measurement machine for determination of at least one space coordinate of a measurement point on an object to be measured. The machine comprises a frame structure with at least one axis of movement comprising: a first frame element, a second frame element, and a drive mechanism which comprises a propulsion motor and which links the first and the second frame element moveably in a direction of movement. A position measurement instrument, for determining a drive position in the direction of movement, is also comprised in the machine, which can be used for determining the space coordinate of the measurement point.

According to the present invention, the drive mechanism is mechanically linked to the frame structure by a mechanical coupler, built in such a way as to actively introduce a counter-displacement, in particular in or opposite to the direction of movement, for at least partially compensating undesired dynamic displacements due to dynamic forces of movement and flexure of the drive mechanism.

In particular, compensation or reduction of dynamic displacements such as:
- a dynamic deformation at acceleration/deceleration of the drive mechanism, for example resulting from components of limited stiffness within the drive unit which are deflected by the forces of movement, in particular by the dynamic forces of movement—but also static deflections can be compensated to a certain extent;
- a transient oscillation, stimulated by the movement of the drive mechanism, for example due to flexibilities within the drive unit which form a spring-mass system having a natural resonance frequency of osculation which can be stimulated by the movement, or overshooting oscillations from the control loop of the drive motor;
- a micro-vibration, introduced by the drive mechanism and/or the propulsion motor, for example vibrations due to the tooth system of a tooth belt, due to cogging of the drive motor, imperfect bearings or linear guides, etc.

The active compensation element according to the invention can thereby take care of and counter the micro vibrations resulting from the drive mechanism and/or the bearings, in particular micro vibrations from a toothed linear drive mechanism which can also comprise components of non-ideal stiffness.

According to the invention, the dynamic deformation under the dynamics of movement of the drive mechanism and/or the frame structure, in particular the one observable at the probe-head, is actively reduced by applying a counter displacement by an additional active compensation actuator to at least partly compensate the dynamic deformation. Thereby, in particular the dynamic deformations and transient oscillations due to acceleration/deceleration of frame components and/or the dynamic oscillations and micro vibrations introduced by elements within the drive mechanism, the propulsion motor and/or bearings are compensated.

In general, this can be achieved according to the invention by measuring or modelling the displacements (or causing or resulting values which are coherent therewith, such as forces, pressure, bending, velocity, acceleration, jerk, etc.) and to generate counter-displacements with opposite sign by an active component, so that the sum of displacements will be reduced, in particular preferably being compensated to zero or at least almost zero.

The counter-displacements can be introduced by actuators of different kinds. As in general the maximum displacement to be compensated is relatively low (e.g. approximately in the range of the stiffness of the drive unit times the applied force), the active compensation actuator does not require a big stroke, e.g. below one cm, in particular in the range of less than two mm or rather in the sub-mm-range. On the other hand, for compensation of the micro vibrations, the actuators are desired to have a comparably high dynamic, preferably up to the frequency range of the vibrations in the actual system, to achieve the required rate of change for the compensation. Particular examples of such actuators can be based on magnetic, electrostatic or piezoelectric principles, wherein embodiments can for example be, piezo-stacks or voice-coils. Due to the general temperature sensitivity of CMMs, an actuator with low waste heat or at least a sufficient cooling and/or a well chosen placement of the active compensation actuator should be considered to avoid sectional heating and temperature strain at the frame of the machine.

The active compensation element can in general be located anywhere between the machine base—holding the object to be measured—and the probe head. A particular example of placement of the active compensation actuator is close to the main source of reduced stiffness and/or micro-vibrations, as this can e.g. also help to avoid a dispersal of the vibrations and oscillations over the whole machine frame, which could cause crosstalk effects on other axes or elements.

For compensating an undesired displacement or dynamic error, the amount of displacement or error has to be evaluated by some quantified value. This evaluation can be achieved by measuring or modelling the displacement or by measuring or modelling the forces which are causing the displacement.

The measuring of the dynamic displacement error can be done by a high accuracy linear scale which is in general present on those machines, for example by a comparison of the measured drive position with the desired position according to the desired trajectory of movement. The difference of those values can e.g. be used as an input to a control loop which drives the active compensation actuator. The control loop can be a simple proportional gain, a PID-loop or a more complex control loop like an observer structure, etc. which can further also be dependent on the actual drive position. The bandwidth of such an active-compensation control loop is in general chosen higher than the one of the main controller for the axis-movement due to the higher dynamics of the effects to be compensated for by the active compensation.

The dynamic error can alternatively also be determined based on values related therewith like bending, force, pressure, velocity, acceleration, jerk, etc. which can be sensed by dedicated sensors like an accelerometer, a strain gauge, etc.

Obviously, another option is to use a dedicated displacement sensor, like a linear scale, a capacitive distance sensor, etc. for the determination of the dynamic displacement. Some actuators like piezo or voice-coils can be used as both sensor and/or actuator, whereby both actuating and sensing can be accomplished by a single component.

The dynamic errors can also be evaluated at a sub-assembly of the drive mechanism. This sub-assembly can be chosen at or close to the "weakest link", which will likely also be the main source of error, and therefor needs to be compensated. The error values measured therein can also be extrapolated to the dynamic errors of the whole drive mechanism or even to the whole machine. For extrapolating, a model of the involved mechanical system can be used, which can be determined according to the stiffness of the whole construction. In special cases, the model can also be parameterized according to measured real world values and/or dependent upon the drive position.

As CMMs measure the actual probe head position, a placement of the active compensation element between the linear measuring scale for determination of the probe head position and the probe head can invalidate the value of the scale oft the determination of the probe head coordinate—in particular if the displacement introduced by the active compensation element is not taken into account in position measurement or is not measured with the required accuracy and/or synchrony to the scales position.

An alternative to the measurement of the displacement error (or alongside effects) is a modelling and prediction of the displacement based on the desired movement, which can help avoiding additional costs of sensors, wirings, etc. To achieve this, a more sophisticated control approach is required. Such an approach can't be used to qualify a certainty of compensation during measurement, if the model does not fit accurately in all situations. Furthermore, a so called Gray-Box model can be used which comprises the basic mechanical structure of the system to be controlled and can be parameterized either by system identification or by entering characteristics like tooth-distance, belt stiffness, weight of the moved mass and the like.

When introducing active compensation in a machine, this fact can also be taken into account in the planning of the trajectory by taking into account both actuators—the propulsion motor and the active compensation actuator. Thereby, a desired role can be allocated to the drive motor and the active compensation actuator already when planning the trajectory, and both of them can be actively controlled accordingly.

A "blind" use of the active compensation actuator with a standalone control loop, compensating the sensed dynamic displacements in the drive mechanism—unaffected by the move planning—is one possible solution according to the invention. Another possible solution according to the invention is the incorporation of the active compensation actuator, which can be seen as a second active propulsion element in the trajectory planning. The latter can gain advantages, in particular for predictable errors, for example by the usage of a feed forward path or a lookahead algorithm in the control loop to operate the active compensation element.

Different combinations of the above mentioned control and measurement approaches can also be used, like
- a combined usage of a scale and an accelerometer for sensing for determining the desired active compensation counter displacement,
- the usage of a measurement and a model prediction of the displacement to be compensated, which can further comprise an congruous planning of the trajectory,
- a standalone active compensation control loop, with a sensed dynamic deflection as input,
- a standalone active compensation control loop, with a sensed driving force of the movement as input,
- an additional transmission of the sensed dynamic deflection error to a main controller for evaluating a thereby corrected position measurement value or an accuracy estimation,
- and many more combinations of the mentioned approaches.

BRIEF DESCRIPTION OF THE DRAWINGS

The method according to the invention and the devices and setup according to the invention are described or explained in more detail below, purely by way of example, with reference to working examples shown schematically in the drawings. Specifically.

The diagrams of the figures should not be considered as being drawn to scale.

DETAILED DESCRIPTION

Figure 1A:
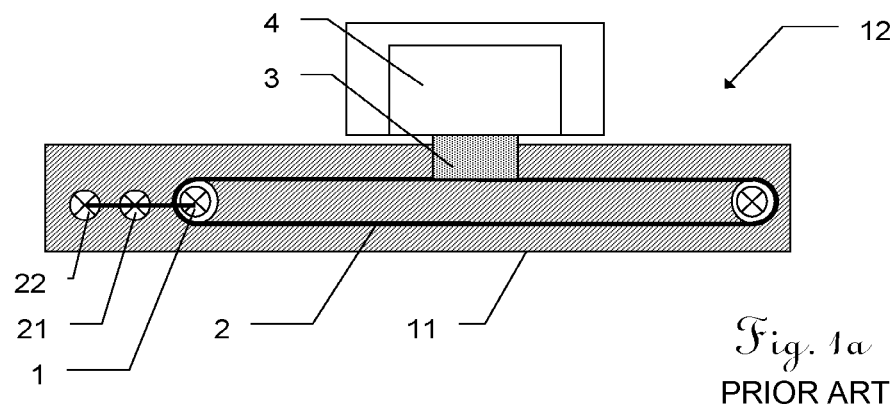
FIG. 1a shows an abstracted schematic of a first axis arrangement according to the invention.
Figure 5:
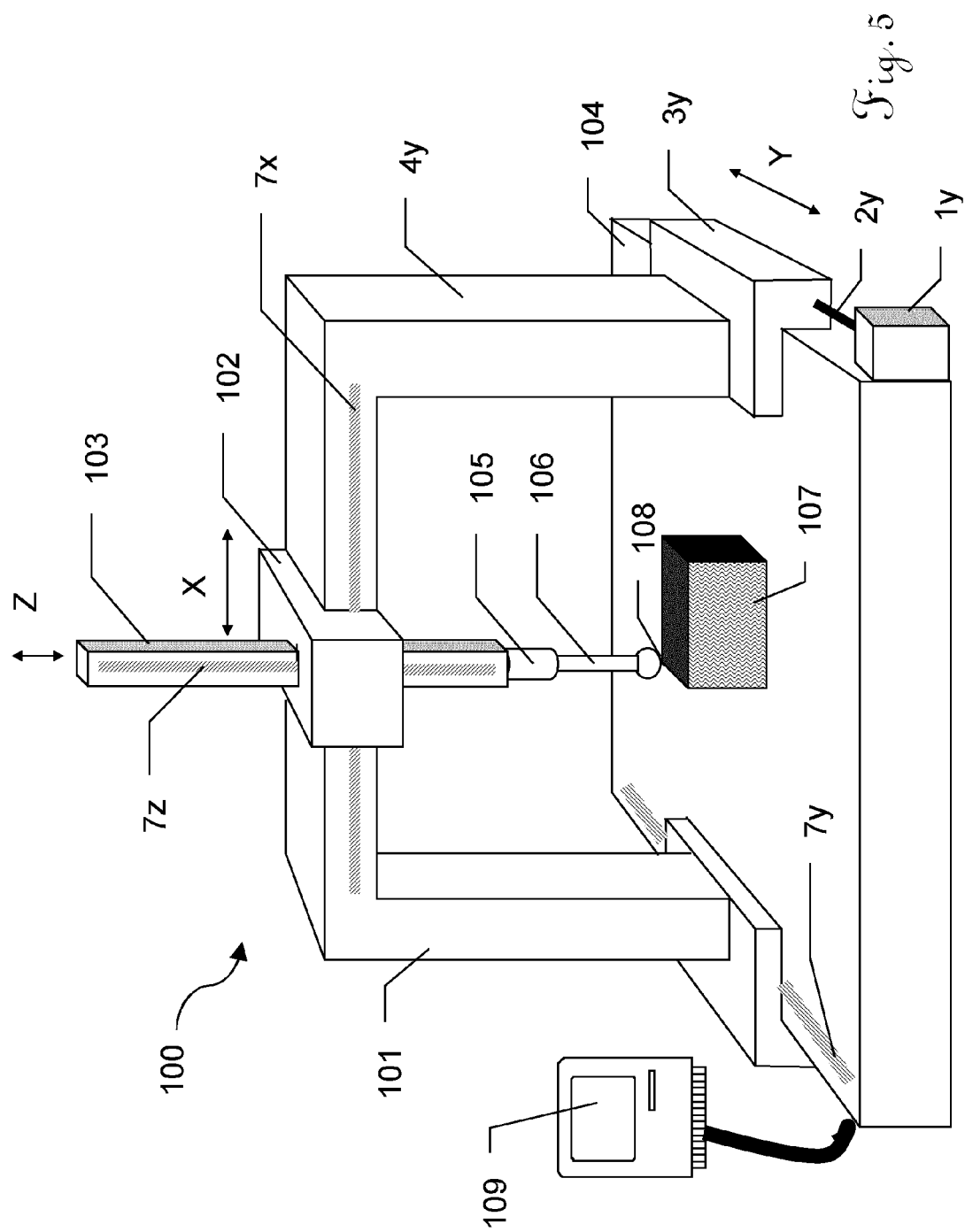
FIG. 5 illustrates an exemplary embodiment of a measurement machine which comprises the invention in at least one of its axes.

FIG. 1a illustrates a schematic sketch of an embodiment of a drive mechanism of a CMM, such as the CMM example shown in FIG. 5, whereto the present invention can be applied.

The schematic figure shows a first frame element 11, in this example the machine base, and a drive-motor 21 connected to a wheel 1 which drives a driving belt 2 and a return wheel on the other side of the belt 2. The drive-motor 21 can further be connected to a position or speed sensor 22. Between the moving belt 2 and a second frame element 4 as a mass to be moved, there is a coupler 3 as connection interface.

Apparently, a CMM with a probe head movable in three degrees of freedom comprises at least three such or similar axes. The practical geometrical arrangements can also vary from the drawing, which shows just one simple and illustrative embodiment.

Figure 1B:
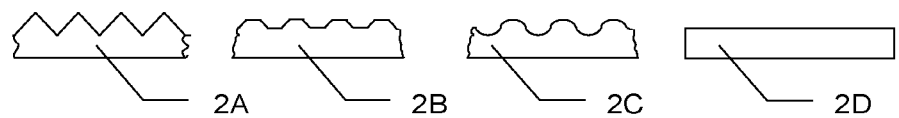
FIG. 1b shows some exemplary subset of transmission belts for CMM drive mechanisms.

FIG. 1b shows some sections of particular embodiments of transmission belts 2 in a magnified cross section view. Those embodiments, which are exemplary out of the plurality of possible embodiments, illustrate different shapes of teeth 2A, 2B, 2C and a toothless belt 2D. Apparently, the drive wheels 1 and the section of the coupler 3, which is transmitting force to and from the belt 2, will be shaped as counterparts to the shape of the used belt 2A, 2B or 2C, in particular regarding the profile of the teeth.

A skilled person is aware of the fact that effects of the tooth-period, as the distance between the teeth, can be observed in highly accurate measurements as ripples or vibrations overlaid to the measured position, velocity or acceleration or audible in structure-borne sound, which will apparently be dependent on the actual speed of movement. Depending on the actual embodiment of the drive mechanism 12, those vibrations can result in reduced measurement accuracy. The teeth-caused vibrations are also referred to as micro-vibrations, as their amplitudes will in general be comparatively low with respect to the movement and other effects.

The un-toothed belt 2D will in general not suffer from such tooth-vibrations, but still other sources of micro vibrations like friction of—in particular not-optimally adjusted—bearings and/or torque-ripples from the propulsion motor 21. Apparently, those other sources of micro vibrations can also be present in all the other mentioned drive mechanisms 12. The mentioned torque-ripples can be the result of the so called motor-cogging or coming from the driving electronics excitation and/or the involved control-loop, for example from a cascaded current control loop which is tuned to slightly overshoot. Flat belts 2D on the other hand can result in undesired slip effects.

In general, all the belt drives suffer from flexure-drawbacks as the stiffness of the belt material is limited and the quite longish geometry and small profile limit the belt's stiffness and result in more or less springy behaviour.

Figure 1C:
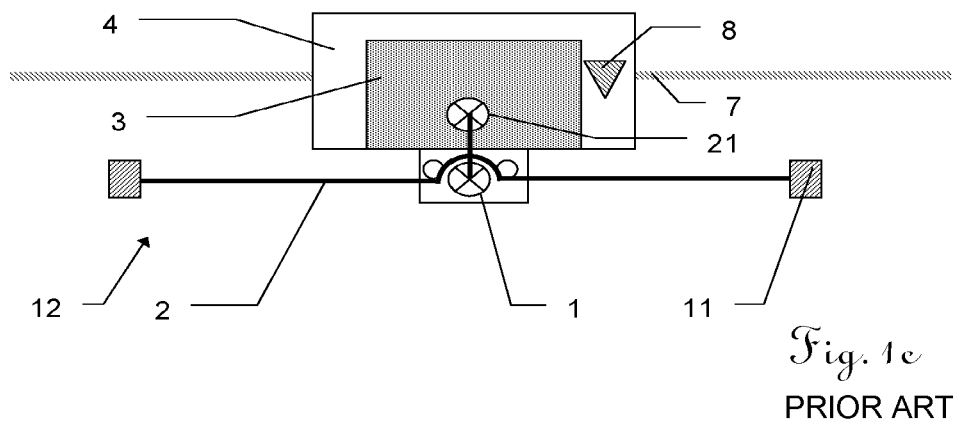
FIG. 1c shows an abstracted schematic of a second axis arrangement according to the invention.

FIG. 1c schematically illustrates an example of another known embodiment of a drive mechanism 12 to which the present invention can be applied. Most of the structural parts are similar to the ones of FIG. 1a, with the main difference lying in the arrangement of the components, resulting in different mechanical characteristics. This figure also shows a position measurement instrument comprising a linear scale 7 and a corresponding reading head 8 which can be used to evaluate a drive position of the second frame element 4 which is moved by the propulsion motor 21 by means of the drive mechanism 12 that comprises a belt 2 and a wheel 1, linked by the element 3.

The determination of the drive position, which in CMMs—due to their nature—has to be accomplished with high accuracy, can for example be done with known optic, electro-optic, magneto-restrictive, magnetic, capacitive, or other linear measurement instruments which can determine the position with high accuracy, in particular in the range of micrometers or even below.

Obviously, there are many alternative arrangements of transmission belts and drive mechanisms 12, which can be used to drive an axis of a CMM. Transmission belts in general can, by their nature, only transmit forces in one direction in a relatively stiff manner, while being comparably weak in other directions. This can be seen as an advantage, as a transmission of undesired lateral loads is thereby suppressed, whereas other, stiffer linear transmissions require special precautions and means.

Figure 1D:
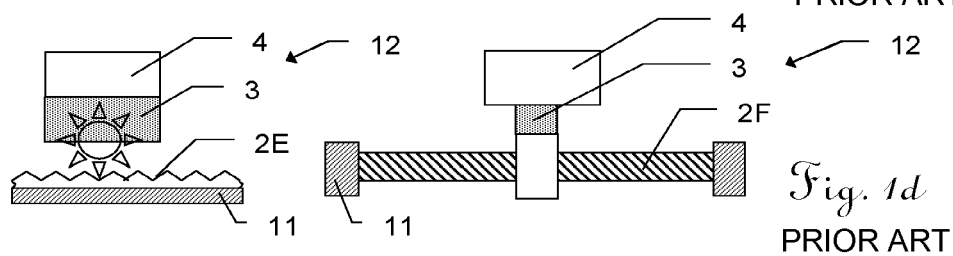
FIG. 1d shows an exemplary subset of alternative transmission systems, which can be used as a substitute for a belt transmission shown in the other figures.

FIG. 1d shows two linear drive mechanisms 12, not being based on a belt drive, to which the present invention can be applied as well. A rack and pinion (or gear rack) 2E and a screw 2F for moving the frame elements 4 and 11 relative to each other, are exemplarily shown. Those can substitute the belt arrangements of FIG. 1a or FIG. 1c as known in the art. Nevertheless, the drive mechanism 12 based on those principles can also suffer from similar problems like limited stiffness, micro-vibrations, backlash, etc. as explained by means of the belt drives above. In particular, those can also be considered as, to some extent flexible, periodically toothed structures. Although this text mainly refers to belts and belt drives, those alternatives are covered as well.

Figure 2A:
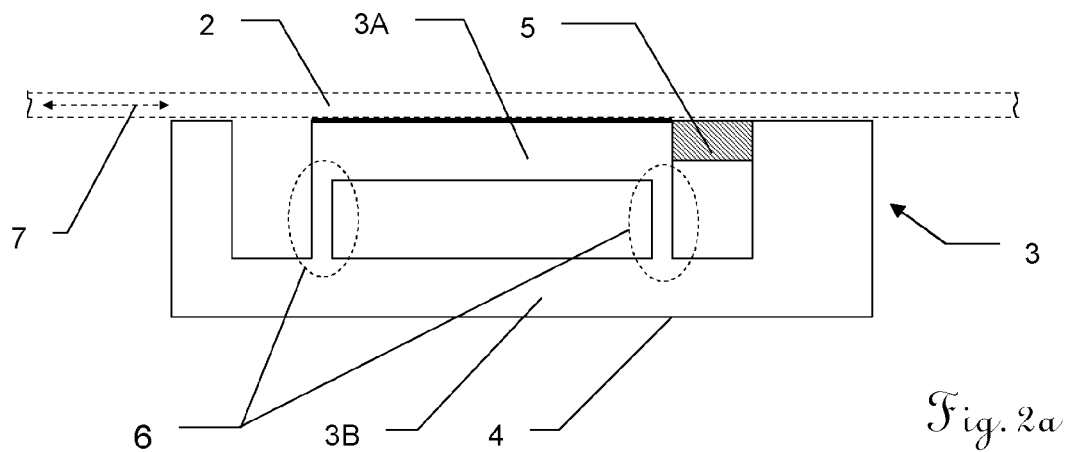
FIG. 2a shows an abstracted view of a first exemplary embodiment of an active compensation element which is comprised in the drive mechanism according to the invention.

FIG. 2a is a magnification of the coupler or connection interface 3 and represents one example of how to connect a tooth-belt 2 and a moving mass 4 of the second frame element by usage of an active compensation actuator according to the invention. In this case, the coupler 3 comprises two parts or "plates" 3A and 3B which are connected to each other with a movable structure in form of a flexible element 6 (such as leaf-springs or the like). One plate 3A (rectangular shape) is connected to the tooth-belt 2 and the other plate 3B (U-shape) is connected to the moving mass 4. Between the plates 3A and 3B there is an actuator 5 that can move the relative position of the rectangular plate 3A towards the U-shaped plate 3B by deforming the flexible element 6 and thereby shifting the movable structure, in particular in or opposite to the direction of movement of the drive unit 12. This means that when the tooth-belt 2 accelerates, there will be forces between the tooth-belt 2 and the moving mass 4—which will stretch the belt 2.

The tension of the belt 2 can be compensated with the actuator 5 that moves the plate 3B the same amount that the belt 2 has been stretched, but in opposite direction. This means that in view of the first and second frame elements, the belt 2 and the coupler 3 together will have virtually infinite stiffness. The counter displacement required therefore—introduced by the active compensation actuator—will be a parameter mainly dependent on the applied force, the belt-stiffness and the effective length of the force transmitting section of the belt 2. Dependent on the actual embodiment of the drive mechanism 12, the effective length can hinge on the drive position, which fact can be taken into account in the determination of the required counter displacement.

The required active displacement compensation to be introduced by the actuator 5 can be determined by measurement of the force applied between the plates 3A and 3B or the belt 2A and the plate 3A, the acceleration at the element 3, the displacement of 3B relative to 3A or to the base frame element 11. An evaluation according to the linear scale from the moved mass 4 can be incorporated as well (see FIG. 3). Also, a combination of the above can be used.

The actuator can, for example, be a piezo actuator. An example of a high power actuator from Piezo Jena is the HP-series like the HP-105-X-Y or HPA-260-X-Y.

The active compensation actuator works in such a way that the forces applied to the moved frame element 4 are smooth and do not comprise ripples and oscillations, which means that, if there are some ripples or oscillations, they are compensated or at least reduced by applying a counter oscillation with the same amplitude, but 180 degrees phase shifted, so that the residual force will comprise almost no oscillations (such as the mentioned transient oscillations and micro vibrations).

If there is a need to disconnect forces in directions other than the drive mechanisms desired direction of movement, e.g. orthogonal towards the driving direction, this can also be done in a similar way by an active displacement actuator, but preferably, such is achieved by other means allowing a flexible coupling in this direction, like some parallel spring.

The flexure of belt 2 results in bending on acceleration and deceleration of the drive mechanism 12 and can also result in oscillations due to the resulting spring-mass configuration.

In other words, the coordinate measuring machine has at least two frame elements 4,11 being movable relative to each other, a linear drive unit 12—with a motor 21 for moving the frame elements 4,11 relative to each other—and a coupler 3, providing a mechanical link for conjoining one of the frame elements 4,11 with the linear drive unit 12. Therein, a moving of the frame elements 4,11 is causing a dynamic deflection in the drive unit 12, in particular wherein the dynamic deflection comprise dynamic deformations, transient oscillations and/or micro-vibrations on dynamic drive movement.

The method according to the invention for actively compensating dynamic deflections in a coordinate measuring machine involves—on moving the at least two frame elements 4, 11 of the CMM relative to each other by the drive unit 12—an actively introducing of a counter-displacement in the coupler 3, for at least partially compensating the dynamic deflection 43 by applying a counter-force by an active compensation actuator 5 in the coupler 3. Thereby, a counter-displacing of the drive unit 12 against one of the frame elements 4, 11 is achieved which (at least partially) compensates the dynamic deflections, in particular wherein the counter-displacement is corresponding but contrarily in direction to the dynamic deflection, preferably wherein the dynamic deflection is determined by measuring a displacement or displacing force.

Figure 2B:
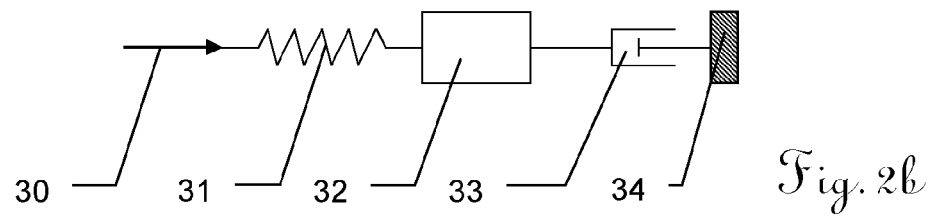
FIG. 2b shows a simplified and abstracted model of a prior art drive mechanism.

FIG. 2b shows a simple, abstracted model of a belt drive as a spring-mass combination. The arrow 30 stands for the actual force introduced by the propulsion motor 21, the spring 31 stands for the flexure of the belt 2, the mass 32 stands for the mass of the second frame element 4 to be moved, the compensation 33 models friction effects and the fixture 34 stands for the first frame element 11. Practical models can be more detailed and e.g. also comprise more sophisticated elements such as backlashes, drive position dependent parameters (e.g. to model a change of the spring constant dependent on the actual length of the force transmitting belt section), or the like.

Figure 2C:
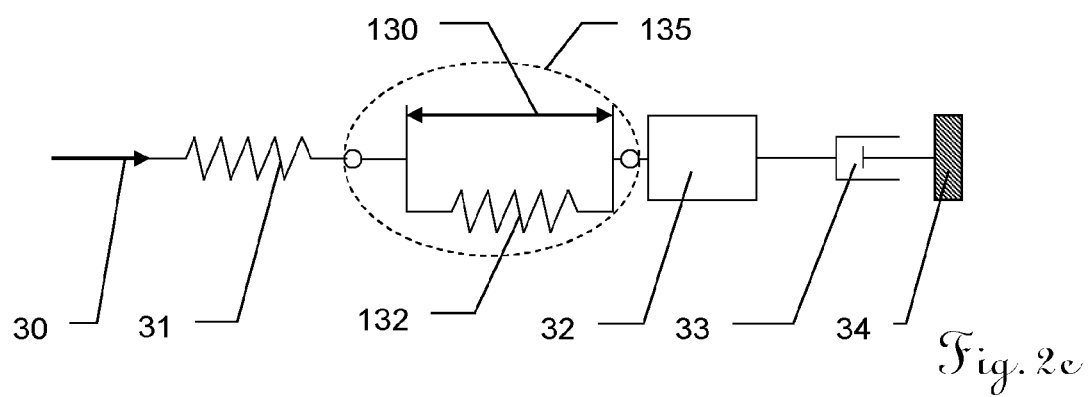
FIG. 2c shows a simplified and abstracted model of the force transmission path with an active compensation element according to the invention.

FIG. 2c shows the abstracted model of FIG. 2b with an additional, simplified model of an active displacement correction unit 135. The coupler with the active displacement correction unit 135 comprises a spring 132 modelling the movable structure 6 and the active displacement actuator 130. In certain embodiments, the actuator 130 can also comprise the flexure 132 inherently and the spring 132 can also have a spring constant of (almost) zero when modelling a movable structure.

The principle will be illustrated in simplified manner by an illustration of the basic effects only, intentionally skipping some side effects which are apparent to a person skilled in the art of mechanics. It is not intended to provide a fully correct mathematical model.

Presuming that the spring 132 has a spring constant being lower than the one of spring 32, also colloquially known as a softer spring, the application of the same force will result in higher stretching at 132 than at 32.

If the active displacement actuator 130 introduces the same force as the driving force 30, the stretching of 132 will be zero, as forces at the active compensation element are in equilibrium.

If the active displacement actuator 130 is introducing a force greater than the force 30, the spring 132 will be compressed, and not bent as the spring 31. Since the spring constant of the spring 132 is low, a force 130 at the active compensation element 135 being a small amount greater than the driving force 30 can result in a counter-compression at the spring 132, which results in a compression-displacement being equal to the stretching-displacement at the stiffer spring 31. Thereby, the whole arrangement can be described as having a virtually infinitive stiffness (or at least an actively increased virtual stiffness, if no full compensation is desired or achieved).

A simple numerical example for explanation, wherein the scaling is chosen for ease of explanation and does not have practical relevance or any limiting effects:
Spring constant $D_{130}$=1 N/mm,
Spring constant $D_{30}$=10 N/mm,
Driving force $F_{30}$=100 N.
This results in a displacement $L_{30}$ of:
$L_{30}=F_{30}/D_{30}$=100 N/10 N/mm=10 mm,
which is the prior art case of an uncompensated machine.

Without force being applied to $D_{130}$ ($F_{130A}$=0) its displacement $L_{130A}$ would be:
$L_{130A}=F_{30}/D_{130}$=100 N/1 N/mm=100 mm
which would be added to the prior art displacement and would obviously not be beneficial in view of compensation.

With the same amount of force $F_{30}$ of 100 N applied in opposite direction to $D_{130}$ as $F_{130B}$=100 N, its displacement $L_{130B}$ will be zero as $F_{30}$ and $F_{130}$ are balanced and no force is acting on the compensation elements spring $D_{130}$.

To achieve the same displacement of 10 mm at the compensation element (but in opposite direction, as compensation is desired), an additional amount of force $F_{130C\_add}$ in the order of:
$F_{130C\_add}=L_{30}/D_{130}$=10 mm/1 N/mm=10 N
has to be applied to $D_{130}$.

This results in a sum of forces $F_{130C}$ at $D_{130}$ of:

$$F_{130C}=F_{130b}+F_{130C\_add}=100\ N+10\ N=110\ N.$$

Thereby the displacement of both of the spring elements together (which are used for modelling the actively damped drive mechanism 12) can be considered to be zero. This can also be interpreted as a virtually infinite stiffness.

An expert might be aware of the fact that above explanation is very much simplified and is not intended to be a highly accurate modelling. Although certain side effects are neglected, the underlying principle of how an active compensation according to the present invention can be achieved is clearly illustrated.

For example, additional forces on the spring 32 due to the force/displacement at the flexure 132 were not considered, but additional stretching resulting therefrom can also be compensated in a similar manner by a further increase of the compensating force.

Besides, not only the stretching and deformation within the drive system itself can be compensated by the coupler 3, but also a compensation or reduction of the effects of deformation of other parts, such as parts of the frame structure, due to the motion forces or dynamic forces can be achieved by a countering active displacement compensation according to the present invention.

The amount of required compensation can be determined based on force measurement, displacement measurement, dynamics measurement (velocity, acceleration). Besides the before-mentioned usage of dedicated sensors, another example could be the measurement of the force introduced by the propulsion motor as a basis for the determination of the desired countering. A particular example can be a usage of the value of the desired or measured propulsion or drive motor current, which is often available for control loop purposes anyway. Alternatively, the amount of compensation can be determined by prediction or modelling of the induced displacement based on the desired trajectory of movement.

Figure 2D:
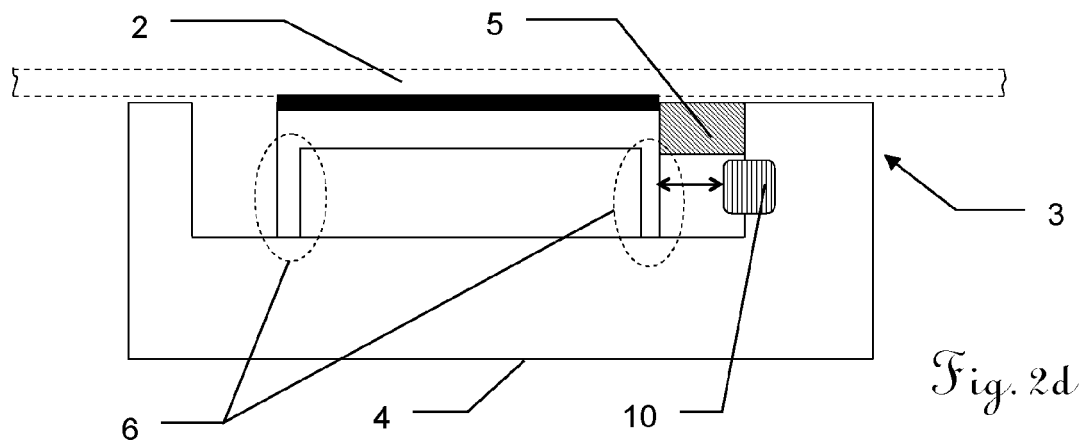
FIG. 2d shows an abstracted view of a first exemplary embodiment of an active compensation element which is comprised in the drive mechanism according to the invention.

As illustrated in the embodiment of FIG. 2d, the measurement of the movement of the moving mass including low-frequency excitations, also referred to as transient oscillations, and high-frequency excitations, also referred to as micro vibrations, could be taken by the piezo itself, whereby the piezo works as both a measurement sensor and an actuator. Alternatively, the measurement can also be done by a distance sensor (optical, capacitive, etc.) which can be located inside the U-shape, parallel to the actuator, which measures the relative movement of the moving mass against the belt. Furthermore, the sensor could be aided by one or more accelerometers, speed sensors or the like for measuring an "absolute" movement. The linear scale reading of the drive position always provides an absolute movement measurement against the relevant second frame element of the CMM.

Figure 3:
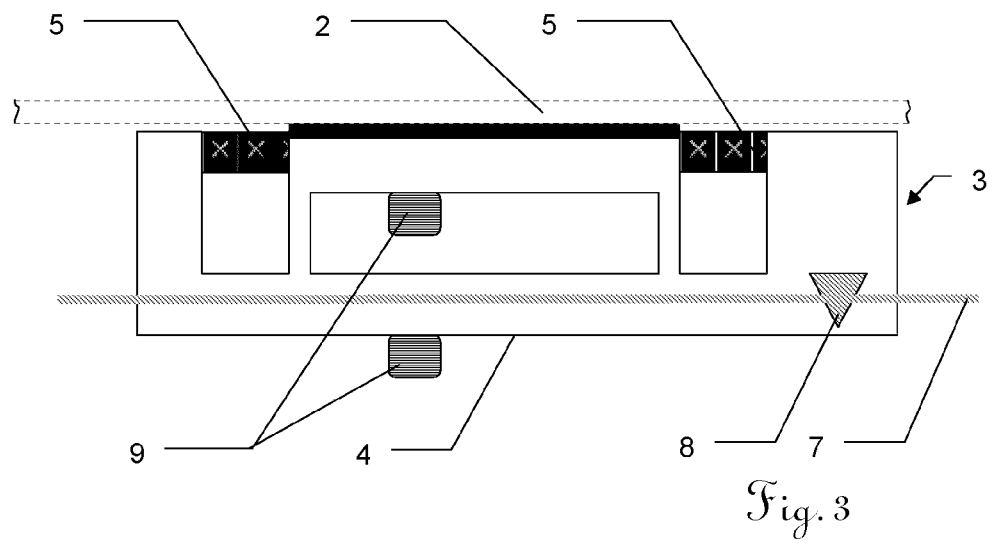
FIG. 3 shows a second exemplary embodiment of an active compensation element, which is comprised in the drive mechanism according to the invention.

In the case of using a piezo as force sensor and actuator, there also can be added a second piezo, e.g. on the other side of the connection to the tooth belt as shown in FIG. 3, to reduce or eliminate hysteresis effects, which typically can appear with piezo actuators. For that purpose, each piezo measures and acts only in one of the two directions of movement while the other piezo only measures and acts in the other, opposite direction. The term "a piezo" can also mean a set or stack of piezos fulfilling the task as described in the embodiments.

As another example, a measurement of force can also be done at the interconnection of the belt 2 and the coupler-part 3A, in particular at the black bar drawn in-between those two elements.

Beside the usage of piezos, e.g. also magnetic actuators such as voice coil drives can be used as active compensation actuators. Also e.g., a strain gauge on the elements 6 can be used as sensor to determine the force or displacement as explained above.

The active compensation actuator can then be controlled according to the deflections or displacements (low- and high-frequency excitations) measured by the sensor such as a piezo, accelerometers, speed sensors, optical or capacitive distance sensors, and of course by the linear scale.

Figure 4:
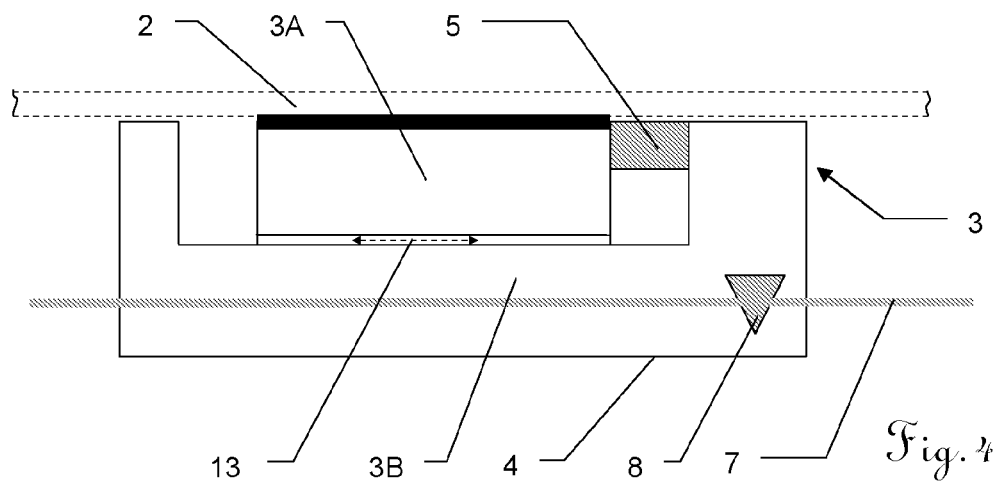
FIG. 4 shows a third exemplary embodiment of an active compensation element, which is comprised in the drive mechanism according to the invention.

In the embodiment of FIG. 4, the movable structure which previous figures was embodied by a flexible element 6 which was deformed by the active displacement actuator for introducing the counter-displacement, has been replaced by a gliding guide 13 which is coupling the parts 3A and 3B. The gliding guide 13 is movable or shiftable in the direction of movement by the active displacement actuator, as indicated by the double arrow. In this embodiment, the active compensation actuator will also mediate forces of movement between the two frame structures.

FIG. 5 shows an exemplary embodiment of a CMM 100. The so called rigid frame of the machine comprises a base or machine bed 104, linked to a Y-axis 101 embodied by a portal 4y by drive mechanism 12 according to the invention with propulsion 1y, a belt drive 2y and a coupler 3y comprising an active compensation actuator according to the present invention. The linear scale 7y is part of an embodiment of a position measurement instrument.

Similar to the y-axis, there is an x-axis with the portal 101 as a first frame element and the second frame element 102 movable relative to each other by another drive mechanism 12 which can also comprise an active compensation element according to the invention.

The third z-axis comprises the frame elements 102 and 103, whereto a probe head 105 can be fixed, whose space coordinates are determinable according to the drive positions measured by 7x, 7y and 7z, and which can be evaluated by the controller 109 or by an external PC linked thereto. The controller 109 is also responsible for a coordinated movement of the axis, e.g. according to predefined measurement programs or by joystick.

The machine is built in such a way as to determine at least one space coordinate of a measurement point 108 on an object 107 to be measured by the, in the drawn example tactile, probe 106 on the probe head 105 which is movable in tree perpendicular directions in space.

The general advantage of the present invention with a coupler having an active compensation actuator is to reduce the impact of the excitations on the final CMM measurements as well as to allow higher speed and dynamics (accelerations) in moving the different parts on a CMM, which is currently restricted by the limited stiffness and the micro-vibrations. By this, in particular the overall measurement accuracy and/or speed of the machine can be increased.

Figure 6:
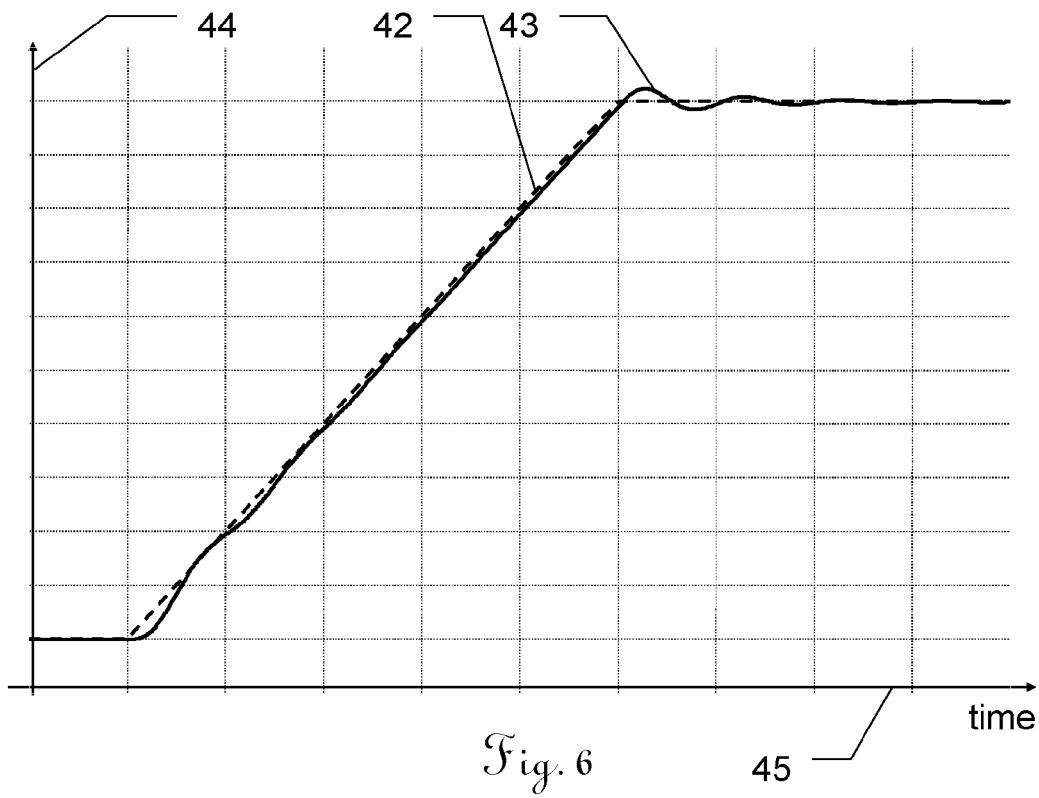
FIG. 6 shows a first example of a trajectory of a moving axis without a setup according to the active compensation element according to the invention.

FIG. 6 illustrates an example of a simple trajectory of a drive mechanism 12 of such a CMM 100 in a position 44 over time 45 view. The dashed line 42 illustrates a simple desired movement as a ramp function, wherein practical desired trajectories are often chosen to be much smoother, e.g. jerk limited S-curves or the like. The solid line 42 is the measured movement of the frame element without with a deactivated active compensation actuator, which shows some transient oscillations due to the flexure of the drive mechanism 12, in particular at acceleration and deceleration and a slight following error in the middle section of the ramp due to elastic deformations which are not fully compensated by the drive mechanisms control loop.

With the active compensation actuator turned on, the actual trajectory 43 can be fitted more closely to the desired trajectory 42, reducing displacement errors and—at least partly—compensating them. To keep the figure clean and simple there is no special line shown for this, but it is referred to an actual trajectory which is closer to or almost fully overlaying the desired one.

Figure 7:
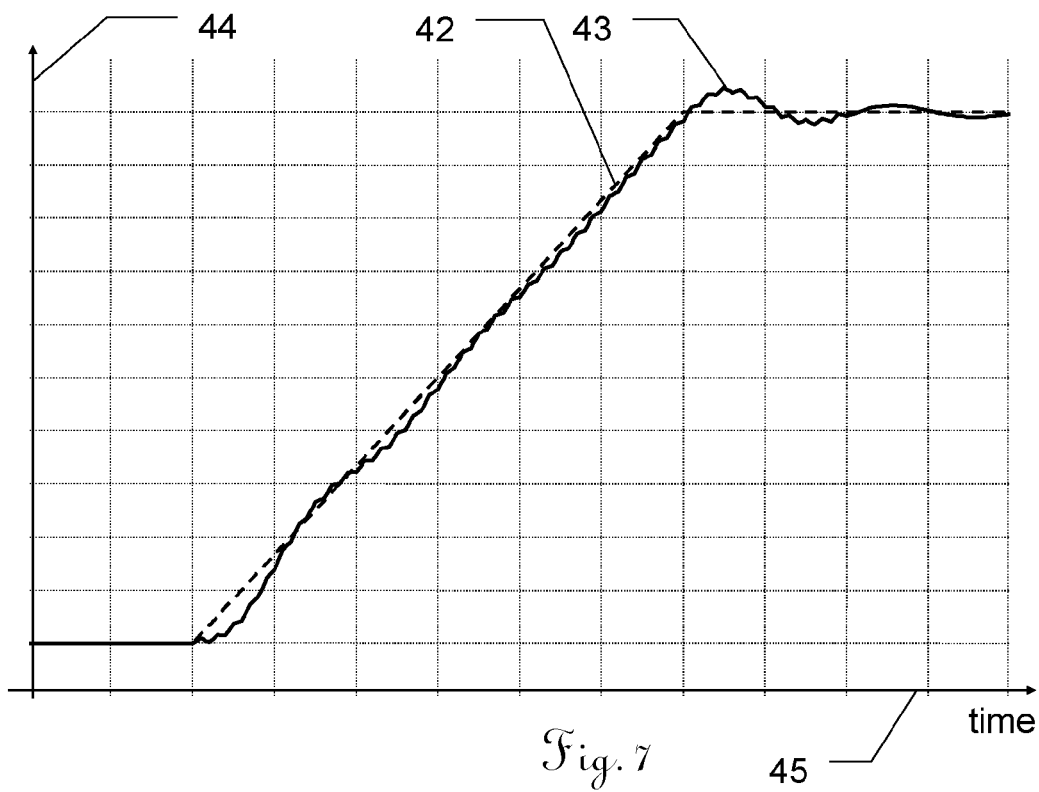
FIG. 7 shows a second example of a trajectory of a moving axis without a setup according to the invention.

FIG. 7 is similar to FIG. 6, but it also illustrates the mentioned micro vibrations of the drive mechanism 12 in the actual trajectory 43 which is now added. In practical embodiments, the micro vibrations are often speed dependent, which is not visible in this figure due to simplicity. By the active compensation according to the present invention, also those micro vibrations can be—at least partly—compensated, resulting in a trajectory very close to the desired one 42.

The active compensation actuator can be controlled by a separate, dedicated control loop, based on the measurement of the sensor only, on the desired and actual drive position, or of a combination of both.

Alternatively, the active compensation actuator control can be nested in the main control loop of the drive mechanism 12.

What is claimed is:

1. A coordinate measurement machine for determination of at least one space coordinate of a measurement point on a measured object, comprising:
   a first frame element;
   a second frame element;
   a linear drive unit with a motor for moving the second frame element relative to the first frame element in a direction of movement; and
   a position measurement instrument, for determining a drive position of the second frame element relative to the first frame element,
   wherein the drive unit has limited stiffness and dynamic deflections on movement, wherein a mechanical coupler from the drive unit to the second frame element, which coupler comprises a first part fixed to the drive unit and a second part fixed to the second frame element, which parts are movable relative to each other by an active compensation actuator, wherein the coupler and the active compensation actuator are built in such a way to shift the second frame element against the drive unit to introduce a counter-displacement for at least partially compensating the dynamic deflections.

2. The coordinate measuring machine according to claim 1, wherein dynamic deflections comprise:
   a dynamic deformation in the drive unit at acceleration/deceleration of the frame element and/or
   a transient oscillation in the drive unit, stimulated by the movement of the frame element.

3. The coordinate measuring machine according to claim 1, wherein the parts are movable relative to each other in the direction of movement by the active compensation actuator.

4. The coordinate measuring machine according to claim 1, wherein the coupler comprises a flexible element between the first and the second part of the coupler and the counter-displacement is introducible by a deformation of the flexible element by the active compensation actuator.

5. The coordinate measuring machine according to claim 1, wherein the coupler comprises a displacement sensor which is built and arranged in such a way to determine the dynamic deflections.

6. The coordinate measuring machine according to claim 1, wherein the dynamic deflections are determined by the sensor:
according to a measured change of geometry of a part of the drive unit; or
according to a measured force or acceleration.

7. The coordinate measuring machine according to claim 6, wherein the active compensation actuator is built in such a way to function as the displacement sensor for determining the dynamic deflections.

8. The coordinate measuring machine according to claim 1, wherein the active compensation actuator is driven by a control loop according to the dynamic deflections determined by the displacement sensor in such a way that the dynamic deflections are at least partially compensated by the counter displacement.

9. The coordinate measuring machine according to claim 1, wherein the active compensation actuator is driven by a control loop according to the dynamic deflections determined by the displacement sensor in such a way that the dynamic deflections are at least partially compensated by the counter displacement with the control loop having a bandwidth higher than the bandwidth of a controller for the drive unit.

10. The coordinate measuring machine according to claim 1, wherein the active compensation actuator comprises a magnetic actuator.

11. The coordinate measuring machine according to claim 10, wherein the active a magnetic actuator is a voice coil.

12. The coordinate measuring machine according to claim 1, wherein the active compensation actuator comprises a drive based on a piezo active material.

13. The coordinate measuring machine according to claim 1, wherein the dynamic deflections are determined by a calculation unit dependent on the difference of a desired trajectory of the movement and the determined drive position from the position measurement instrument.

14. The coordinate measuring machine according to claim 1, wherein the drive unit comprises a belt drive with a belt for the transmission of forces of movement.

15. The coordinate measuring machine according to claim 14, wherein the belt is a tooth belt.

16. The coordinate measuring machine according to claim 14, wherein the coupler conjoins the second frame element with the belt and compensates the dynamic deflections resulting from a strain of the belt due to the forces of movement.

17. The coordinate measuring machine according to claim 1, wherein the dynamic defections comprise a micro-vibration, introduced by the drive unit.

18. The coordinate measuring machine according to claim 17, wherein the micro-vibration results from a tooth system within the drive unit and/or torque ripples from the motor.

19. A method for actively compensating dynamic deflections in a coordinate measuring machine° comprising:
at least two frame elements being movable relative to each other;
a linear drive unit with a motor for moving the frame elements relative to each other;
a coupler, providing a mechanical link for conjoining one of the frame elements with the linear drive unit,
wherein moving of the frame elements is causing a dynamic deflection in the drive unit, and wherein the method comprises:
moving the at least two frame elements relative to each other; and
actively introducing a counter-displacement in the coupler for at least partially compensating the dynamic deflection by applying a counter-force by an active compensation actuator in the coupler and thereby counter-displacing the drive unit against one of the frame elements.

20. The method according to claim 19, wherein the dynamic deflection comprise dynamic deformations, transient oscillations and/or micro-vibrations on dynamic drive movement.

21. The method according to claim 19, wherein the counter-displacement is corresponding but contrarily in direction to the dynamic deflection and the dynamic deflection is determined by measuring a displacement or displacing force.

22. The method according to claim 19, wherein a controlling of the active compensation actuator according to a desired trajectory of the drive mechanism by a main control loop which is also controlling the drive unit.

23. The method according to claim 19, wherein a controlling of the active compensation actuator in a dedicated control loop according to the determined dynamic deflections.

24. The method according to claim 23, wherein the controlling is independent of a main control loop for controlling the drive unit and having a higher bandwidth than the main control loop.

25. A computer program product with program code being stored on a machine readable medium, the program code being configured to automatically execute and operate the method of actively reducing dynamic deflections according to claim 19.

* * * * *